April 16, 1940.　　　B. C. PLACE　　　2,197,590
FASTENER
Filed Oct. 21, 1935
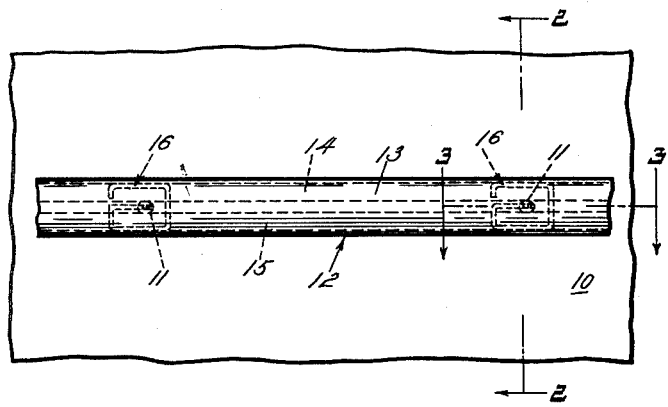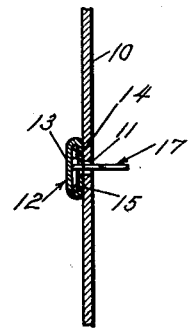
Fig. 1　　　Fig. 2
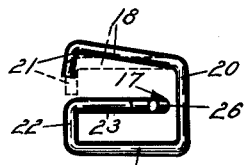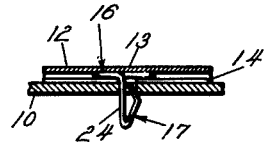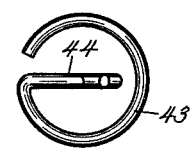
Fig. 4　　Fig. 3　　Fig. 10
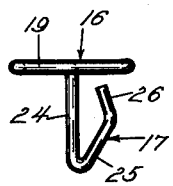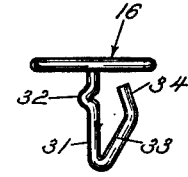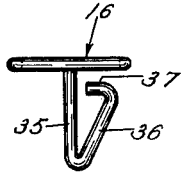
Fig. 5　　Fig. 7　　Fig. 8
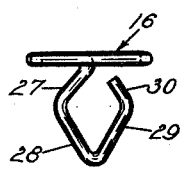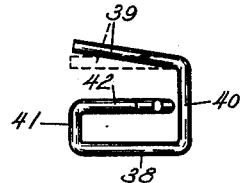
Fig. 6　　Fig. 9
Inventor
Bion C. Place
By Strauch & Hoffman
Attorneys Patented Apr. 16, 1940

2,197,590

UNITED STATES PATENT OFFICE 2,197,590

FASTENER

Bion C. Place, Detroit, Mich., assignor of one-half to George E. Gagnier, Detroit, Mich.

Application October 21, 1935, Serial No. 46,009

3 Claims. (Cl. 24—215)

This invention relates to a snap fastener designed for use in the attachment of trim material, moldings or the like to perforated metallic supporting structures. More particularly the invention is concerned with an improved stud fastener constructed from a single piece of stiff and resilient wire.

The primary object of the present invention is to provide a stud fastener of a form capable of being readily manufactured in very small sizes and with few bends in the wire from which the fastener is constructed.

This invention also aims to provide a stud fastener consisting of a head and a shank in which the head is constructed from one end of the wire and in which the shank is completely constructed from the other end of the piece of wire.

Another object of this invention is to provide a fastener having a head designed particularly for insertion in hollow moldings, the head having two approximately parallel portions designed to engage opposite parallel walls of the molding.

Still another object of the invention is to provide a spring stud fastener constructed from a single piece of wire and having a shank consisting only of a single leg that depends from the head and is bent into the form of a loop shaped to provide the necessary holding shoulder or shoulders for engagement with the inner corner or corners of a perforation in the supporting structure in which the shank of the fastener may be inserted.

Another object of the invention is to provide a spring stud fastener having a head including two approximately parallel straight portions, one portion of which is free and slightly divergent with respect to the other portion so that when the head is inserted endwise in a hollow molding having parallel walls a firm frictional contact is provided whereby the fastener will be held in position in the molding.

Further objects of the invention will appear as a description thereof proceeds with reference to the accompanying drawing in which Figure 1 is a fragmentary view showing a part of a molding attached upon a suitable metallic supporting structure by the improved fastener of the present invention.

Figure 2 is a sectional view taken on the plane indicated by line 2—2 of Figure 1.

Figure 3 is a fragmentary sectional view taken on the plane indicated by the line 3—3 in Figure 1.

Figure 4 is a view of the fastener included in Figures 1, 2 and 3, on an enlarged scale, looking toward the head of the fastener.

Figure 5 is an edge view of the fastener of Figure 4.

Figure 6 is a view corresponding to Figure 5 and showing a modified form of fastener.

Figure 7 is a view similar to Figure 5, but showing a further modified form of fastener.

Figure 8 is a view similar to Figure 5 and showing a still further modified form of fastener.

Figure 9 is a view looking toward the head of another fastener having a head of a modified form.

Figure 10 is a view of a further modified fastener looking toward the head thereof.

Like reference characters indicate like parts throughout the several figures.

The fastener of the present invention, about to be described, is intended particularly to secure a hollow molding upon a metallic supporting structure of plate-like form provided only with a perforation for the reception of the shank of the fastener. In the drawing, 10 designates a supporting structure of the character just referred to provided with perforations 11 for the reception of the fasteners that retain the molding 12 upon said structure. Molding 12 is of conventional form comprising a body portion 13 having the edges turned inwardly into parallelism with the body 13 and in spaced relation thereto, the inturned edges being designated by the numerals 14 and 15. Moldings of the character just described are now widely used upon automotive vehicles for ornamentation or for utilitarian purposes.

In Figures 1, 2 and 3 of the drawing, the molding 12 is secured upon the supporting structure 10 by means of a preferred form of fastener, constituting the present invention, said fastener comprising a head designated as a whole by 16 and a shank designated as a whole by the numeral 17. The head 16 is housed within the hollow molding, as illustrated, and the shank 17 projects between the edges of the flanges 14 and 15 through the perforation 11 in the supporting structure in a manner now well understood in the art.

The head 16 of the fastener of the present invention is formed from a piece of stiff resilient wire and comprises two approximately parallel straight portions 18 and 19 connected together by a connecting portion 20. Preferably the head of the fastener also includes further portions 21 and 22 preferably disposed in parallelism with the portion 20, portion 21 being formed from one extreme end of the piece of wire from which the fastener is constructed as illustrated in Figure 4. When the head of the fastener is constructed as just described, it will be appreciated that the various portions thereof form a substantially closed figure presenting no exposed end. The portion 18 of the head of the fastener, preferably, diverges slightly with respect to the approximately parallel portion 19 and the portions 18 and 19 are spaced apart at the point of maximum divergency somewhat in excess of the distance separating the opposite walls of the hollow moldings with which the fastener is intended to contact. Because of this arrangement when the fastener is slipped endwise into the molding the portion 18 is pressed inwardly toward exact parallelism with part 19, providing a frictional grip of the head of the fastener with the walls of the hollow molding. Said grip is effective to retain the fastener in position and prevent it from sliding along the length of the molding during the course of application of the molding to the supporting structure. Furthermore, the slight divergency of the portion 18 with respect to the portion 19 serves to adapt the head of the fastener for use with moldings of slightly varying transverse internal dimensions, such slight variations frequently occurring in practice. In Figure 4 the parallel position toward which the portion 18 is moved when the fastener is assembled in the molding is indicated in dotted lines.

The head of the fastener also includes an arm 23, preferably disposed in the plane of the loop formed by the portions 18, 19, 20, 21 and 22, and from the arm 23 the shank 17 of the fastener depends. Said shank is constructed from the other end of the piece of wire from which the fastener is constructed, and in the form of the invention illustrated in Figures 1 to 5, of the drawing, consists of a single straight depending leg 24, a portion 25 turned back from the end of the leg 24 toward the head of the fastener and diverging from the leg 24 and a portion 26 turned inwardly toward the leg 24.

In using the fastener of the present invention to secure moldings upon a supporting structure, the fasteners are first inserted in the hollow moldings as by slipping the fasteners from an end thereof to a predetermined position, portion 18 of the head yielding toward the portion 19 in the manner above described as the heads of the fasteners are slid to their positions along the length of the molding. After the required number of fasteners have been assembled with respect to the molding as just stated, the molding is applied to the supporting structure by successively snapping the shanks which protrude away from the molding into the apertures in the supporting structure. In passing the shanks of the fasteners through said apertures, it will be understood that the end of the leg 24 of each fastener is entered into an aperture and when pressure is applied the free end of the piece of wire from which the shank of the fastener is constructed is deflected toward the leg 24 by engagement of the inclined exterior surface of the portion 25 with a corner of the opening. In this way the tranverse dimension of the shank of the fastener is diminished and the shank may be passed through the perforation. After it has passed said perforation, the resilient free end of the piece of wire springs toward its normal position, causing the inclined portion 26 to engage with a corner of the opening, as illustrated in Figure 3 of the drawing, said last named inclined portion providing thus an inclined shoulder which serves to retain the shank of the fastener within the aperture in the supporting structure.

The fastener just described is capable of being readily produced in any size, and since the shank of the fastener is carried by a single leg the inturned flanges of the hollow molding need not be widely spaced apart and the aperture in the supporting structure can be small without interference with the functioning of the fastener. Furthermore in view of the fact that the portion 18 of the head which is intended to flex when the head of the fastener passes into a hollow molding is free at one end, a relatively high degree of flexibility is provided in the head of the fastener.

In Figure 6 a modified form of fastener is illustrated in which the shank consists of a depending leg 27 bent at an acute angle to the plane of the head 16. The depending leg is then bent at an obtuse angle to the portion 27 as shown at 28. The shank of the fastener in this form of the invention also includes a return bent portion 29 which diverges with respect to the portion 28 and an inwardly turned inclined portion 30 providing an inclined holding shoulder corresponding to the inclined shoulder 26 of the fastener of Figures 4 and 5. The fastener of this form of the invention is used in the same way as above described with reference to the fastener particularly shown in Figures 4 and 5.

In Figure 7 a still further modification of the fastener of Figures 4 and 5 is illustrated. In this figure the shank consists of a depending leg 31 provided with a crimp or corrugation 32 providing a holding shoulder on the leg 31. The shank of the fastener in this form of the invention also includes portions 33 and 34 corresponding in structure and function to portions 25 and 26 of the fastener of Figures 4 and 5.

Referring to Figure 8 a still further modification of a fastener of the type of Figures 4 and 5 is illustrated. The fastener of Figure 8 comprises a depending leg 35, a return bent inclined portion 36 and an inwardly turned end 37, the latter being bent into approximate parallelism with the head 16. It will be understood that the fastener of this form of the invention provides a holding shoulder disposed at right angles to the length of the shank. A shank of the form illustrated in Figure 8 is preferred when it is desired to provide a fastener, the shank of which cannot readily be withdrawn from the aperture in the supporting structure. In the forms of the invention illustrated in Figures 5, 6 and 7 the shank of the fastener can be withdrawn from the apertures in the supporting structure by prying the molding away from the supporting structure, the inclined holding shoulders 26, 30 and 34 causing a contraction of the shank of the fastener necessary to permit its withdrawal from said aperture in a manner that will be apparent.

Figures 9 and 10 illustrate fasteners having heads of configurations differing somewhat from the configuration of the head of the fastener of Figure 4. Referring to Figure 9, the head there shown which is formed from one end of the piece of wire from which the fastener is constructed comprises straight portions 38 and 39 in approximate parallelism, said portions being connected together by a portion 40. The head of the fastener also includes a portion 41 carrying an arm 42 to which is secured the depending shank of the fastener which is constructed from the other end of a piece of wire in any of the forms illustrated in Figures 5, 6, 7 or 8. It will be observed that the straight portion 39 diverges slightly with respect to the portion 38, the free end of said portion being relatively freely movable toward the dotted line position illustrated in Figure 9, when the head of the fastener is inserted in a hollow molding.

In Figure 10 the head of the fastener comprises a substantially complete circular loop 43, constructed from one end of the piece of wire from which the fastener is made. Said head also includes an arm 44 preferably disposed in the plane of the head and carrying the shank of the fastener which may assume either the form of Figures 5, 6, 7 or 8. The fastener illustrated in Figure 10 is adapted to be used to secure any trim material upon a supporting structure. The head of the fastener of this form of the invention may be supplied with a sheet metal cap to cover the wire frame if the fastener is used in any position in which its head is exposed. While the fastener of Figure 10 may be used to secure moldings in place the fastener of this figure is intended for use in securing upholstery panels or like finish material by using it in a manner now well understood in the art.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fastener for securing an element having an opening to an apertured support, comprising a single strip of spring wire having one portion, beginning at one terminus of the strip of wire, in the form of an open approximately rectangular head portion having one side formed from a wire end so as to be yieldably engageable with the element, a portion of the strip contiguous to and at the end of the said head portion remote from the free end of the head portion extending inwardly of the head portion and spaced from the said free end of the head portion and terminating approximately at the center thereof, and a portion contiguous to the inwardly extending portion and extending abruptly from the plane of the head portion and being in the form of an approximately closed loop, said closed loop having a portion intermediate its ends in the form of a blunt rounded nose with legs divergent from the nose toward the head portion part-way of their length and convergent toward the head portion for the remainder of their length, the one of said convergent legs beyond the nose from the said inwardly extending head portion of the wire being spaced for its full length from said approximately rectangular head portion and remainder of the closed loop and terminating at the other terminus of said strip of wire and having its free end disposed in outwardly spaced relation with respect to the center of the head portion and inwardly spaced relation from the periphery thereof and being capable of bodily movement toward and away from the other leg, said loop being receivable in the opening in the member and in an aperture of said support by flexure of said closed loop, and said convergent leg portions being engageable with the wall defining said aperture upon reflexure of said loop.

2. A fastener for securing an element having an opening to an apertured support, comprising a single strip of spring wire having one portion, beginning at one terminus of the strip of wire, in the form of an open head having a portion yieldably engageable with the element, a portion of the strip contiguous to and at the end of the said head portion remote from the free end of the head portion extending inwardly of the head portion and spaced from the said free end of the head portion and terminating approximately at the center thereof, and a portion contiguous to the inwardly extending portion and extending abruptly in a straight line from the plane of the head portion and having a rebent portion providing with said straight portion a substantially closed loop, said closed loop provided by said rebent portion having a blunt rounded nose, said rebent portion providing a leg divergent from the straight portion from the nose toward the head portion part-way of its length and convergent toward the head portion for the remainder of its length, the last named convergent leg beyond the nose from the said inwardly extending head portion of the wire being spaced for its full length from said head portion and the remainder of the closed loop and terminating at the other terminus of said strip of wire and having its free end disposed in outwardly spaced relation with respect to the center of the head portion and inwardly spaced relation from the periphery thereof and being capable of bodily movement toward and away from the straight leg, said closed loop receivable in the opening in the member and in an aperture of said support by flexure of said closed loop, and said convergent leg portion being engageable with the wall defining said aperture upon reflexure of said loop.

3. A fastener for securing an element having an opening to an apertured support comprising a single strip of spring wire having one portion, beginning at one terminus of the strip of wire, in the form of an open head portion yieldably engageable with the element, a portion of the strip contiguous to and at the end of the said head portion remote from the free end of the head portion extending inwardly of the head portion and spaced from the said free end of the head portion and terminating approximately at the center thereof, and a portion contiguous to the radially extending portion and extending abruptly from the plane of the head portion and being in the form of a substantially closed loop, said loop having its end in the form of a blunt rounded nose with a straight leg, and an outwardly bowed leg extending from the nose toward the head portion, said bowed leg diverging from said straight leg part-way of their length and convergent toward the head portion for the remainder of their length, said bowed leg being spaced for its full length from said head and the straight leg of said closed loop and terminating at the other terminus of said strip of wire and having its free end disposed in outwardly spaced relation radially of the head portion from the center thereof and inwardly spaced relation radially from the periphery thereof and being capable of bodily movement toward and away from the other leg, said closed loop being receivable in an aperture of said support by flexure of said loop, and said convergent leg portion being engageable with the wall defining said aperture upon reflexure of said loop.

BION C. PLACE.